United States Patent

Stauber

[15] 3,658,630
[45] Apr. 25, 1972

[54] LABELING MACHINE WITH LABEL ON-ROLLING DEVICE

[72] Inventor: Kurt Stauber, Barbing, Germany

[73] Assignee: Hermann Kronseder, Neutraubling, Germany

[22] Filed: Nov. 4, 1969

[21] Appl. No.: 873,832

[30] Foreign Application Priority Data

Nov. 8, 1968  Germany..........................P 18 07 753

[52] U.S. Cl..............................156/566, 156/453, 156/455
[51] Int. Cl............................................B65c 9/36, B65c 9/34
[58] Field of Search..................156/448, 449, 453, 455, 458, 156/566, 567; 198/167

[56] References Cited

UNITED STATES PATENTS

| | | | |
|---|---|---|---|
| 1,810,619 | 6/1931 | Oslund | 156/493 X |
| 3,360,260 | 12/1967 | Rapparlie et al. | 198/167 X |
| 1,410,845 | 3/1922 | Stevens | 156/453 |

Primary Examiner—Benjamin A. Borchelt
Assistant Examiner—J. M. Hanley
Attorney—Wheeler, House & Wheeler

[57] ABSTRACT

A label on-rolling apparatus for a labeling machine includes a battery or succession of pairs of spaced soft, spongy and resilient rollers, with the rollers in each pair located on opposite margins of the conveyor and separated by a gap which defines a feed path. The rollers in each pair rotate in opposite directions and at different speeds, and the adjacent rollers along the same margin also rotate at different speeds. The speed differential between the rollers in each pair and the speed differential between adjacent rollers on each margin causes sequential counter rotation or rotary oscillation of containers as they move along the feed path through the adjacent pairs of rollers, causing firm pressure to be applied to the surface of the label to firmly affix the label to the container. A modified embodiment of the invention includes one longitudinal row of rollers located along one margin of the conveyor with adjacent rollers in the row rotating at different speeds, and an endless belt having a run located over the opposite margin of the conveyor and driven in a direction common with the conveyor and at a different speed than some of the rollers.

7 Claims, 4 Drawing Figures

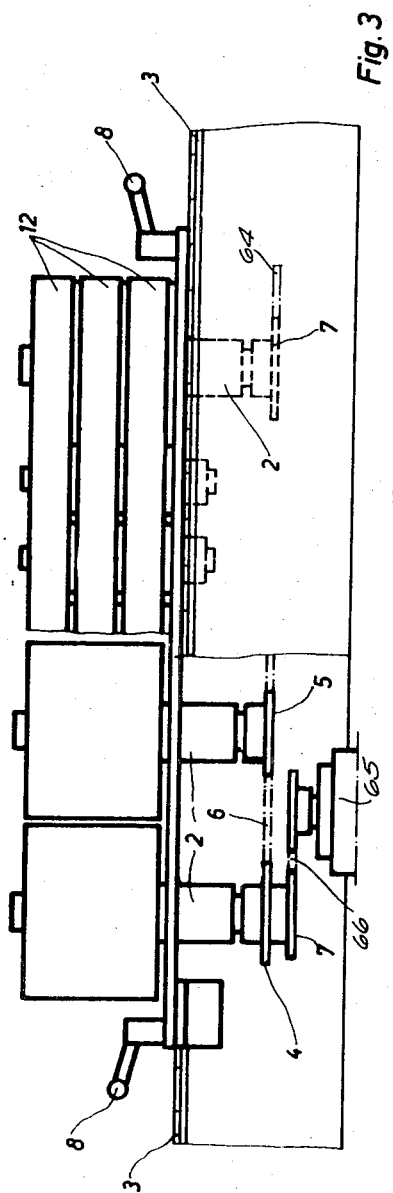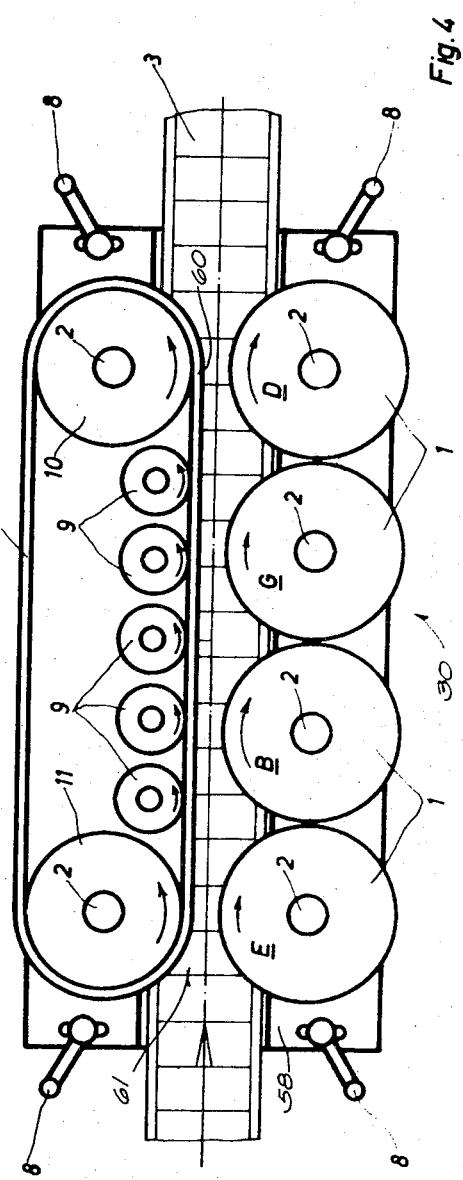

LABELING MACHINE WITH LABEL ON-ROLLING DEVICE

BACKGROUND OF INVENTION

Prior art label on-rolling apparatus includes a conveyor with two spaced endless belts covered with sponge rubber and having adjacently located runs driven in the same direction and at different speeds to cause rotation of the container as it travels between the runs. Another form of on-rolling station includes one sponge rubber covered endless belt and a fixed sponge rubber surface spaced from the endless belt. Inasmuch as the container moving through on-rolling stations of the foregoing arrangements rotates continuously in one direction, the labels commonly creep, shift or ride upwardly or downwardly on the container. Furthermore, the sponge rubber surface on the belts is continuously stretched as it travels around the bends in the conveyor and tends to loosen from the belt, resulting in considerable lost time in replacing the belts.

SUMMARY OF INVENTION

The invention provides on-rolling apparatus which eliminates and minimizes the difficulties with the prior art apparatus by providing on-rolling apparatus in the form of a battery or succession of pairs of oppositely located soft, spongy resilient rollers, with the rollers in the pairs located along the opposite margins of a conveyor which carries the containers from the label turret. The rollers in each pair are separated by a gap which defines a feed path for the containers carried by the conveyor. The adjacent surfaces of the rollers in each pair rotate in a direction common to the direction of the conveyor. The rollers in each pair rotate in different directions and at different speeds. The adjacent rollers along each margin rotate at different speeds and in the same direction. The pairs of rollers impart translatory motion to the containers as they move between the pairs, and the speed differential between rollers in each pair causes the container to rotate in a direction counter to the direction of rotation of the higher speed roller in each pair. The differential speed between the adjacent rollers on each margin causes sequential counter rotation or rotary oscillation of the containers as they move between the successive pairs of rollers.

The sequential counter rotation of the containers minimizes any tendency of labels to creep or progressively shift or displace on the containers as with the prior art on-rolling apparatus. The use of spongy rubber rollers also minimizes the crumbling or fragmentation of the rubber from the rollers, which occurs with the use of foam covered endless belts.

A modified embodiment of the invention utilizes one longitudinal row of soft, spongy resilient rubber rollers along one margin of a conveyor with the adjacent rollers in the row rotating at different speeds. An endless belt having a run located along the opposite margin of the conveyor is driven in a direction common with the direction of the conveyor, and at a speed different than some of the rollers. As with the first embodiment, the differential speed between adjacent rollers causes sequential or successive counter rotation of the containers to firmly apply the labels and minimize shifting of the labels.

The on-rolling apparatus of the invention provides trouble-free performance and improved appearance of the labels on the containers. Extremely long labels are also easily applied with this apparatus.

Further objects and advantages of the invention will become apparent from the following disclosure.

THE DRAWINGS

FIG. 1 is a diagrammatic side elevational view of the label rolling apparatus of the invention.

FIG. 2 is a plan view of the apparatus shown in FIG. 1.

FIG. 3 is a diagrammatic partially broken away side elevational view of a further embodiment of the label pressing apparatus of the invention.

FIG. 4 is a plan view of the apparatus shown in FIG. 3.

DESCRIPTION OF THE DRAWINGS

Although the disclosure hereof is detailed and exact to enable those skilled in the art to practice the invention, the physical embodiments herein disclosed merely exemplify the invention, which may be embodied in other specific structures.

In the drawings.

Figure 1:
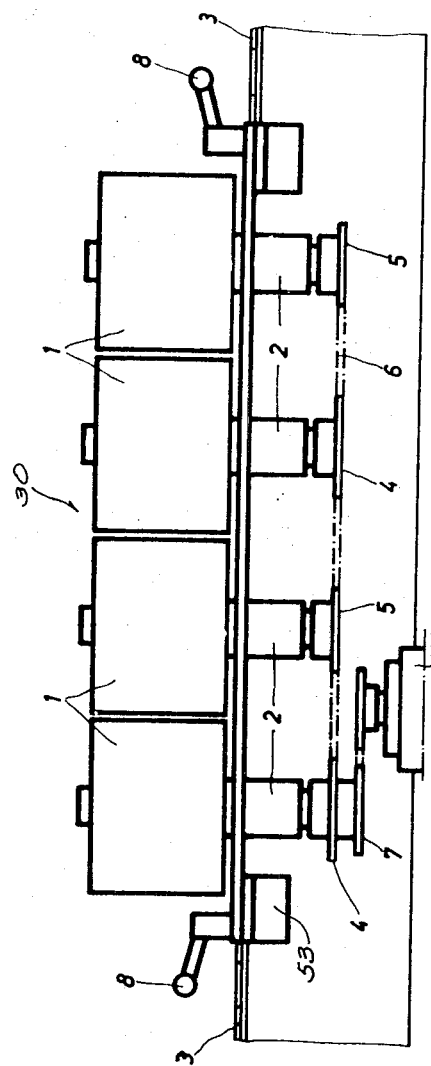
FIGS. 1 and 2 show a conveyor 3 which carries containers from the label application station (not shown). In accordance with the invention, means are provided associated with the conveyor 3 and engageable with the surface of the containers carried by the conveyor to afford translatory movement of the containers along the conveyor and rotary oscillation of the container or sequential counter rotation of the container to firmly press the glued labels against the surface of the container.
Figure 2:
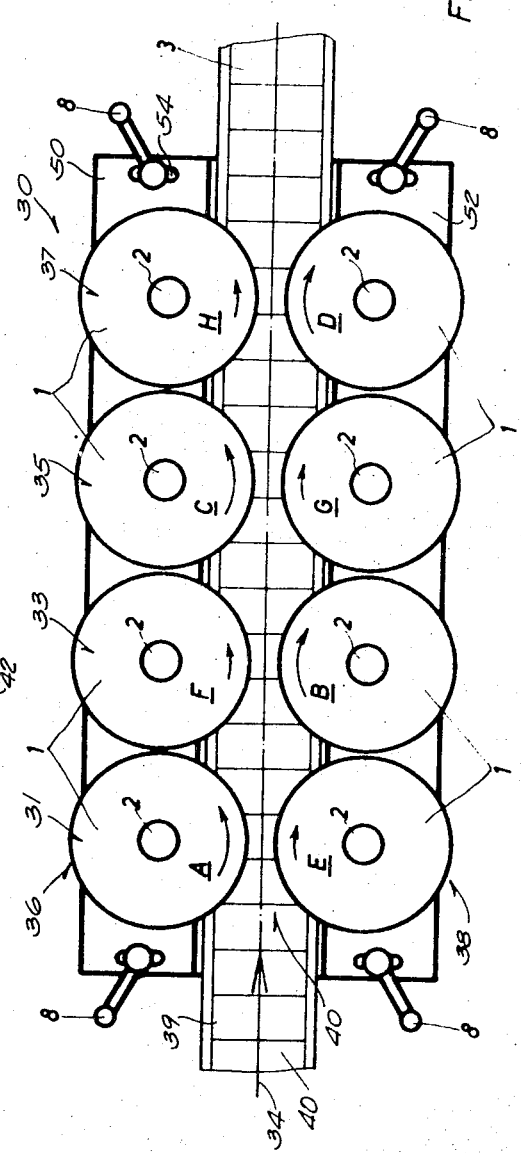

In the construction disclosed in FIGS. 1 and 2, the means associated with the conveyor 3 includes a battery 30 of soft spongy, resilient rollers 1 which are arranged in four pairs of oppositely located rollers. Rollers A and E form a pair 31; rollers B and F form a pair 33; rollers C and G form a pair 35, and rollers H and D form a pair 37. The rollers A, F, C and H form a longitudinal row 36, and the rollers E, B, G and D form a longitudinal row 38. The row 36 overlaps the margin 39 of the conveyor 3, and the row 38 overlaps the margin 41 of the conveyor 3. The rollers in each pair are spaced by gaps 40 to provide a feed path for the containers carried by conveyor 3.

Means are provided for rotating the rollers 1 in each row 36 and 38 at different speeds with respect to each adjacent roller in the row. As disclosed, the rollers in row 38 are driven by a motor 42, which is connected to a drive wheel 7 on shaft 2, which drives a sprocket wheel 4.

The sprocket wheel 4 is connected to sprockets 5, 4 and 5 on rollers B, G and D by a chain or belt 6. The sprockets 4 have a greater pitch diameter than the sprockets 5. Thus, the rollers E and G rotate at a first rate of rotation, and the rollers B and D rotate at a second rate of rotation greater than the first rate of rotation. Similarly, the rollers A and C and F and H are connected to a motor (not shown) so that the rollers F and H rotate at a first rate of rotation and the rollers A and C rotate at a second rate of rotation greater than the first speed.

The opposed rollers in each pair have differing speeds, thus roller E has a speed less than roller A, and roller B has a higher speed than roller F, etc.

Because of the speed differential between the opposite rollers in each pair, a container will be rotating clockwise as it passes between the pair 31. As the container passes between the roller 33 pair, it will be rotated counterclockwise. In like manner, as the container passes between the roller pair 35 it will again be rotated clockwise, and as it passes between roller pair 37 it will again be rotated counterclockwise. The sequential counter rotation or rotary oscillation of the container ensures that intense pressure will be applied to all portions of the label to firmly affix the label to the container, and also minimizes any tendency of the label to shift or ride up or down the container.

Means are also provided for laterally adjusting the rows of rollers with respect to the centerline of the conveyor to vary the spacing or gap 40 between the rollers to accommodate various sized containers. As disclosed, the means includes roller supports 50 and 52 which carry the rollers and transversely extending slots 54 and locking levers 8 which secure the supports 50 and 52 to a frame 53 (FIG. 1).

FIGS. 3 and 4 disclose a further embodiment of the invention. In this embodiment, the means associated with the conveyor 32 and engageable with the surface of the containers to afford translatory movement of the containers along the conveyor and rotary oscillation of containers comprises a row of rollers 1 designated E, B, G and D, with the rollers E and G rotating at a first rate of rotation and rollers B and D rotating at a second rate of rotation greater than the first rate of rotation. The means also includes one or more endless belts 12 having a run 60 travelling in the direction of movement of the conveyor 3 and spaced from the periphery of the rollers E, B, G and D by a gap 61. The endless belts 12 travel at a constant speed and are driven by a motor (not shown) which is connected to a driving wheel 7 on shaft 2 by a belt or chain 64. The rollers E, B, G and D are driven by a motor 65 which is connected to the drive sprocket or wheel 7 by a chain or belt 66. The shafts 2 of the rollers are connected by sprockets 4 and 5 and an endless chain 6. The sprockets 4 and 5 have different pitch diameters to provide a speed differential between adjacent rollers.

The run 60 is maintained in substantially the same plane by a series of idler rollers 9 so that firm pressure can be applied to a container.

As the container travels along the conveyor 3, the greater peripheral speed of the run 60 as compared with roller E will cause the container to rotate clockwise. As the container passes between the run 60 and roller B, the greater peripheral speed of the roller B will cause the container to rotate counterclockwise. When the container is between the roller G and the run 60, it will again rotate clockwise.

The soft, spongy rollers 1 in both embodiments of the invention provide trouble-free operation and firmly and smoothly apply labels to the containers.

What is claimed is:

1. In a labeling machine including a label on-rolling station, a conveyor for transporting containers through the station, the improvement comprising means associated with said conveyor and engageable with containers carried by said conveyor for affording translatory movement and rotary oscillation of the containers as they move along said conveyor, and for applying pressure to the labels as the containers oscillate to firmly affix the labels to the containers, said means comprising a battery of spaced pairs of oppositely located rollers along the margins of said conveyor with each roller in each of said pairs rotating at different rates of rotation and in different directions of rotation, and with the adjacent rollers on the same margins of the conveyor successively rotating at alternately higher and lower rates of rotation to provide sequential counter rotation of containers carried by said conveyor as they move between and are successively engaged by said pairs of rollers.

2. The invention of claim 1 including means for supporting the rollers along each margin of said conveyor to afford lateral movement of rollers transversely to the direction of movement of the conveyor to afford adjustment of the spacing between the pairs of rollers to accommodate different sized containers.

3. The invention of claim 1 wherein said rollers are soft and resilient.

4. The invention of claim 1 wherein one roller in each pair operates at a first rate of rotation and the other roller in each pair rotates at a second rate of rotation greater than said first rate of rotation, and the adjacent rollers along each margin of said conveyor alternatively operate at said first and second rates of rotation.

5. In a labeling machine including a label on-rolling station, a conveyor for transporting containers through the station, the improvement comprising means associated with said conveyor and engageable with containers carried by said conveyor for affording tranlatory movement and rotary oscillation of the containers as they move along said conveyor, and for applying pressure to the labels as the containers oscillate to firmly affix the labels to the containers, said means comprising an endless belt having a run moving in a direction common with the direction of said conveyor and located along one margin of said conveyor, and a longitudinal row of rollers located along the opposite margin of said conveyor with adjacently located rollers in the row successively rotating at alternately higher and lower rates of rotation to afford sequential counter rotation of the containers as they move between and are engaged by successive rollers and said run of said endless belt.

6. A labeling machine including a conveyor, first and second rollers located along one margin of said conveyor, a third roller located opposite said first roller and a fourth roller located opposite said second roller, and said third and fourth rollers being located along the opposite margin of said conveyor, said first and second rollers being spaced from said third and fourth rollers, and means for rotating said rollers so that said first and second rollers rotate in a direction counter to the direction of rotation of said third and fourth rollers, and for rotating said first roller at a rate of rotation greater than the rate of rotation of said second and third rollers, and for rotating said fourth roller at a rate of rotation greater than the rate of rotation of said second and third rollers, so that a container moving between said first and third rollers is rotated in a direction counter to the direction of rotation imparted by said first and third rollers as it moves between said second and fourth rollers, whereby the labels on said containers are firmly pressed against said containers.

7. A labeling machine including a conveyor, a row of soft, spongy rollers located along one margin of said conveyor, adjacent rollers in said row successively rotating at alternately higher and lower speeds, an endless belt having a run located along the opposite margin of said conveyor and spaced from said rollers to provide a gap which defines a container feed path, said run of said belt and said rollers cooperating to move containers along said feed path and sequentially counter rotate said containers as the containers pass between the adjacent rollers and said endless belt so that the rollers can firmly press the labels onto the containers.

* * * * *